United States Patent [19]

Schulz

[11] 3,995,503
[45] Dec. 7, 1976

[54] MULTIPLE-SPEED HUB
[75] Inventor: Horst Schulz, Friedrichshafen, Germany
[73] Assignee: Fichtel & Sachs A.G., Schweinfurt am Main, Germany
[22] Filed: May 15, 1975
[21] Appl. No.: 577,753
[30] Foreign Application Priority Data
May 29, 1974 Germany .......................... 2426133
[52] U.S. Cl. ............................................. 74/750 B
[51] Int. Cl.² ......................................... F16H 3/44
[58] Field of Search ..................... 74/750 B, 781 B; 192/6 A

[56] References Cited
UNITED STATES PATENTS

| 2,327,740 | 8/1943 | Pfister | 74/750 B |
| 2,844,050 | 7/1958 | Brendel | 74/750 B |
| 3,299,745 | 1/1967 | Toplis | 74/750 B |
| 3,432,013 | 3/1969 | Matsumoto | 74/750 B X |
| 3,828,627 | 8/1974 | Schwerdhofer | 74/750 B |

Primary Examiner—Samuel Scott
Assistant Examiner—Lance W. Chandler
Attorney, Agent, or Firm—Hans Berman

[57] ABSTRACT

The transmission ratio of a multiple-speed hub for a bicycle or like vehicle may be changed by axially shifting the ring gear of a planetary gear transmission in the hub shell against the restraint of a return spring. A pawl on the ring gear and/or ratchet teeth on the hub shell have cooperating engagement faces which are obliquely inclined relative to the hub axis in such a manner that the driving force transmitted by the pawl to the ring gear has an axial component in the direction of the return spring action, thereby further axially securing the ring gear in at least one speed position of the hub, minimizing avoidable clearances, and reducing wear of the gear elements.

8 Claims, 14 Drawing Figures

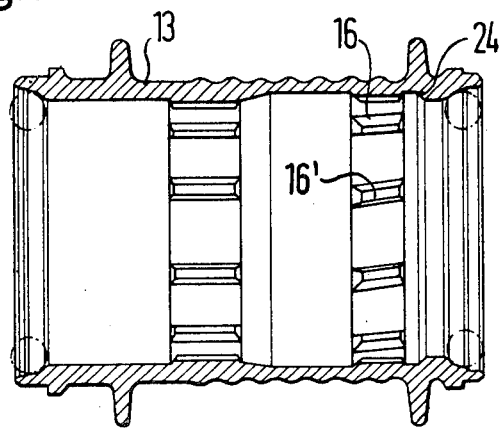
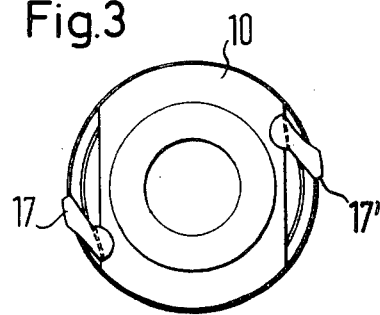
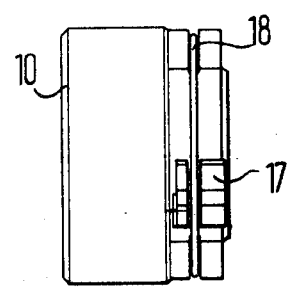
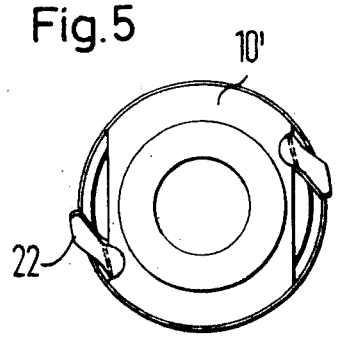
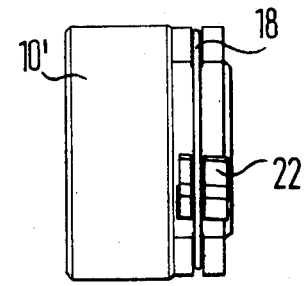

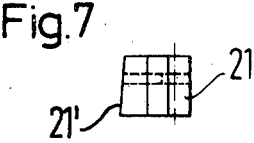
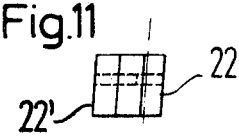
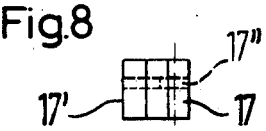
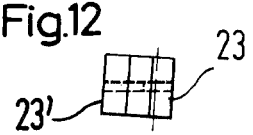
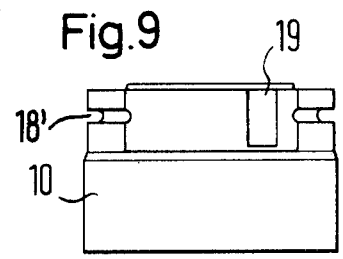
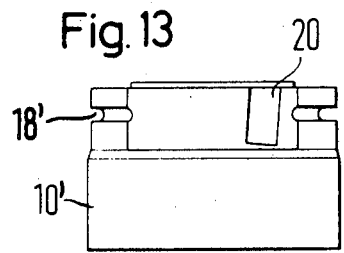
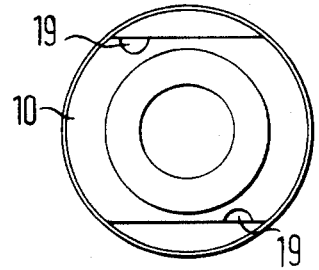
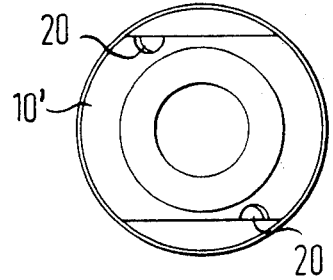

MULTIPLE-SPEED HUB

This invention relates to multiple-speed hubs for bicycles and like vehicles, and particularly to an improvement in a hub in which the transmission ratio between an input member, such as a driver, and the hub shell is varied by axially shifting the position of a gear member in a planetary gear transmission mounted in the hub shell, a pawl coupling being interposed between the gear member and the hub shell.

In a conventional hub of the type described, the ring gear member and the planet carrier member of the planetary gear transmission are permanently connected by planet gears rotatably mounted on the planet carrier member and simultaneously meshing with the ring gear member and a normally fixed sun gear, the planet carrier and ring gear members being axially moved relative to each other by manual controls, one of the two members being moved axially relative to the hub shell.

To achieve adequate distribution of the load on the planet gears, usually three in number and equiangularly distributed about the hub axis, the axially movable transmission member must be mounted in the hub shell with ample nominal clearance, and any additional clearance due to minor manufacturing variations permits undesirable and virtually uncontrolled small movements of the axially movable transmission member which cause premature wear, improper engagement of hub elements, such as the pawl couplings, and malfunctioning of the hub as a whole.

An object of the invention is the provision of a multiplespeed hub of the general type described above which avoids the detrimental effects of minor manufacturing variations on the proper functioning of the hub.

A further object is the provision of such an improved hub which is of simple construction and assembled easily from relatively few parts capable of being manufactured in a simple manner.

With these and other objects in view, as will hereinafter become more fully apparent, the multiple-speed hub of the invention includes the usual hub shell, driver, and planetary gearing including a sun gear, a ring gear member, a planet carrier member mounted in the hub shell for rotation of the ring gear and planet carrier members relative to the sun gear and the hub shell, and at least one planet gear rotatably mounted on the planet carrier member and simultaneously meshing with the sun gear and the ring gear member.

A first coupling device alternatively couples the ring gear and planet carrier members to the driver for joint rotation. A second coupling device includes cooperating elements respectively mounted on the hub shell and on the ring gear member or the planet carrier member. One of the cooperating elements includes a pawl having a first engagement face, and the other element includes a plurality of ratchet teeth circumferentially distributed about the central axis of the hub and having each a second engagement face engageable with the first engagement face of the pawl.

Either the planet carrier member or the ring gear member is axially movable in the hub shell, and at least one of the first and second engagement faces is obliquely inclined relative to the central hub axis, whereby the axially movable transmission member is urged to move in an axial direction in the hub shell during driving engagement of the first and second engagement faces.

When manually operable controls are provided for shifting the axially movable member, and a return spring biases the movable member in a direction opposite to the action of the controls, the axial direction of spring-biased movement is the same as that of movement caused by the cooperating, at least partly oblique engagement faces in the second coupling device.

Other features, additional objects, and many of the attendant advantages of this invention will readily be appreciated as the same becomes better understood by reference to the following detailed description of preferred embodiments when considered in connection with the appended drawing in which:

FIG. 2 shows the hub shell of the device of FIG. 1 in rear-elevational section;

FIGS. 3 and 4 illustrate the ring gear in the hub of FIG. 1 in side elevation and in rear elevation together with associated pawls and a pawl spring;

FIGS. 5 and 6 show a modified ring gear and associated pawls and a pawl spring in views respectively corresponding to those of FIGS. 3 and 4;

FIGS. 7 and 8 are rear-elevational views of respective types of pawls for use in the ring gear of FIG. 3, the ring gear alone being shown in FIG. 9 in rear elevation and in FIG. 10 in side elevation; and FIGS. 11 to 14 illustrate respectively two types of pawls associated with the ring gear seen in FIG. 5, and the ring gear alone in views corresponding to those of FIGS. 7 to 10.

Figure 1:
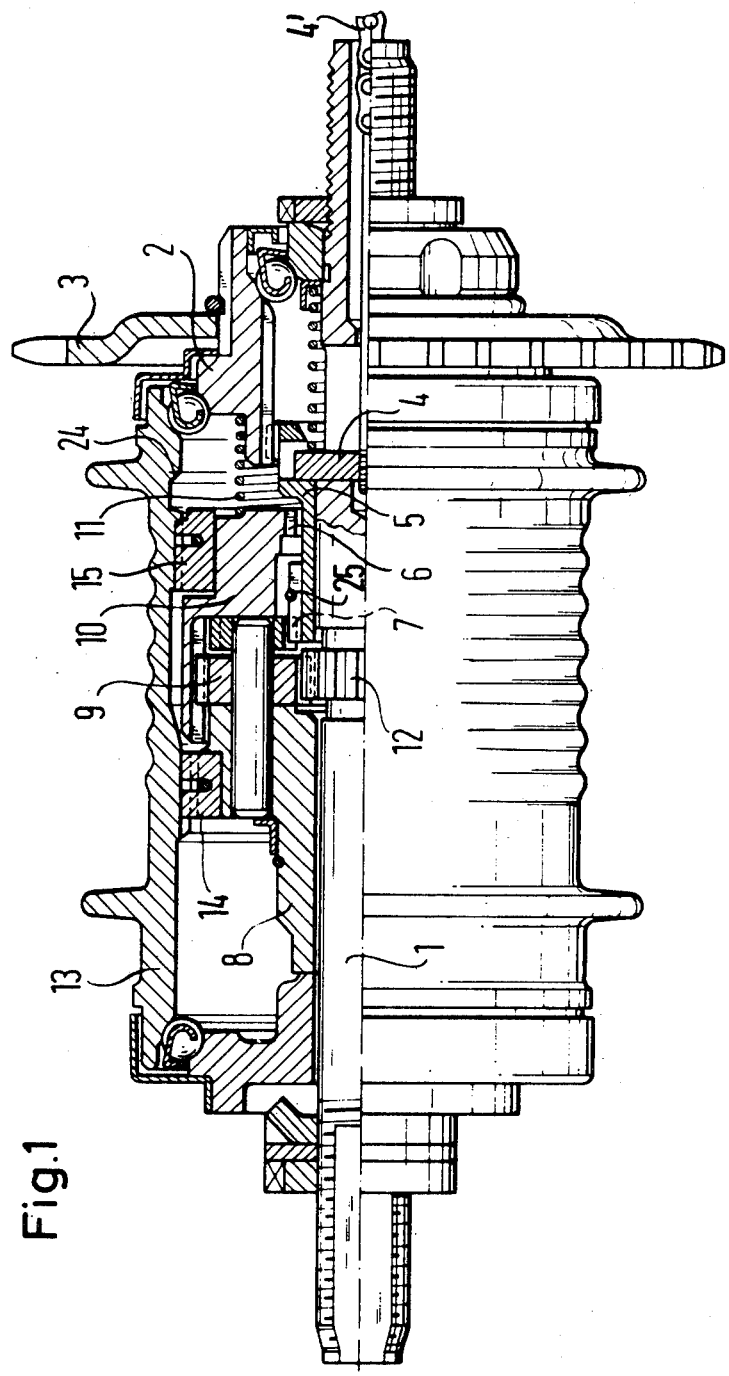
FIG. 1 shows a bicycle hub of this invention in rear elevation and partly in section on its axis.

Referring now to the drawing in detail, and initially to FIG. 1, there is shown a three-speed bicycle hub mounted for rotation on a partly tubular shaft 1 which is normally fixedly fastened in the frame of a bicycle. A tubular driver 2 is freely rotatable on the shaft 1 about the shaft axis which is the central axis of the hub, and carries a fixedly fastened sprocket 3 for a drive chain. A slide 4 may be moved axially in the bore of the shaft 1 toward the right from the illustrated position by a manually operated speed-control mechanism of which only a link chain 4' is seen in the drawing. A portion of the slide 4 projects radially from the shaft 1 through an axial guide slot in the shaft and is received in an inwardly open recess of a coupling sleeve 5 so that the sleeve 5 moves axially with the slide 4. Axially elongated, circumferentially distributed ribs project radially outward from the sleeve 5 and are interengaged with the corresponding radially inwardly projecting ribs on the driver 2 so that the sleeve 5 rotates about the central hub axis with the driver 2 in all axial positions of the sleeve.

Similar ribs on the end of the sleeve 5 remote from the driver 2 alternatively engage one of two sets of coupling ribs or teeth 6, 7 in respective axial positions of the sleeve 5, the ribs or teeth 7 projecting in a radially inward direction from an axially fixed planet carrier 8 carrying the equiangulary distributed planet gears 9, and the ribs or teeth 6 similarly projecting from an axially movable ring gear 10, the planet carrier 8 and ring gear 10 coaxially rotating about the central hub axis during normal operation of the hub. A helical compression spring 11 is axially interposed between the driver 2 and the ring gear 10 to bias the ring gear axially toward the planet carrier 8.

A sun gear 12 is fixedly mounted on the shaft 1, and the planet gears 9, of which only one is shown in the drawing, mesh simultaneously with the sun gear 12 and the ring gear 10. The planet carrier 8 may be coupled to the hub shell 13 which encloses the elements described so far except for the sprocket 3, by a pawl coupling 14, and the hub shell 13 may also be driven by means of a pawl coupling 15 when the latter connects the ring gear 10 to the hub shell. The structure as described so far is not significantly different from what has been known before.

As is best seen in FIG. 2, the hub shell 13 carries two axially spaced, circumferential rows of internal ratchet teeth for cooperation with pawls of the couplings 14, 15 respectively. The ratchet teeth 16, which are elements of the coupling 15, have engagement faces 16' obliquely inclined relative to the central hub axis. The teeth 16 cooperate with pawls 17, also shown in FIGS. 3, 4, and 8.

The orthogonal radial projection of each pawl 17 into a plane tangential relative to a cylinder about the central hub axis is a parallelogram, more specifically a rectangle, as is shown in FIG. 8, so that the pawl does not project axially beyond the ring gear 10 even if the latter is axially quite short.

The ring gear 10 is formed with a circumferential first groove 18' in a plane which is radial relative to the central hub axis or perpendicular to the hub axis. A pawl spring 18 is received in the groove 18' in all operating conditions of the hub, the spring 18 being a circularly arcuate piece of spring wire whose longitudinal ends may abut each other, overlap each other, or be circumferentially spaced, as is known in itself.

The groove 18' intersects two recesses in the circumference of the ring gear 10 each of which partly constitutes a second groove 19 which has an axis parallel to the central hub axis and is of circularly arcuate, more specifically cylindrical cross section perpendicularly to its axis. The grooves 19 receive respective conforming portions of the pawls 17 for pivoting movement of the engagement faces 17' of the pawls 17 under the biasing force of the spring 18 radially outward of the recesses in the ring gear 10 for engagement with the ratchet teeth 16. The engagement faces 17', as is evident from FIG. 8, are perpendicular to a groove 17" in the pawl which receives the spring 18 and is located in the same radial plane as the circumferential groove 18'.

The basic mode of operation of the multiple-speed hub shown in FIGS. 1 – 4 and 8 – 10 is not significantly different from that of a similar prior art hub. In the high-speed position of the planetary gearing illustrated in FIG. 1, torque is transmitted from the driver 2 to the hub shell 13 by way of the coupling sleeve 5, the planet carrier 8, the planet gears 9, the ring gear 10, and the pawl coupling 15 so that the hub shell 13 rotates at a higher speed than the driver. When the slide 4 is shifted toward the right, as viewed in FIG. 1, by a conventional manual control apparatus represented only by the chain 4', the sleeve 5 transmits torque from the driver 2 directly to the ring gear 10 which in turn drives the hub 13 through the coupling 14 at the rotary speed of the driver. When the chain 4' is pulled further, an abutment 25 on the sleeve 5 moves the ring gear 10 from the illustrated position toward the driver 2 against the restraint of the spring 11, and the pawls 17 are retracted from their operative position against the pawl spring 18 by a conical cam face 24 of the inner hub shell wall. Torque is transmitted from the driver 2 to the sleeve 5 and thence sequentially to the hub 13 by way of the ring gear 10, the planet gears 9, the planet carrier 8, and the pawl coupling 14. The hub shell turns at a speed slower than that of the driver 2.

The driving pressure of the pawls 17 on the oblique ratchet teeth 16 has two component. A circumferential component turns the hub shell 13. An axial component acts in the same direction as the spring 11 and reliably holds the ring gear 10 in the position of axial abutment against the planet carrier 8 shown in FIG. 1 when the planetary gearing is set for its high and intermediate transmission ratios, thereby preventing any movement of the ring gear 10 relative to other transmission elements that could not be prevented adequately by the spring 11, and increasing the useful life of the gearing elements and of the pawl coupling 15.

The hub described is capable of many variations within the spirit of this invention, and only a few such variations are shown in FIGS. 5 – 7 and 11 – 14.

FIG. 7 shows a pawl 21 which may be substituted in the otherwise unchanged apparatus of FIGS. 1 – 3 and 8 – 10 instead of the pawl 17. The engagement face 21' of the pawl 21 is obliquely inclined relative to the central hub axis and parallel to the engaged faces 16' of the ratchet teeth 16 for full area contact.

The ring gear 10' shown in FIGS. 5, 6, 13, and 14 has a groove 20 transverse to the unchanged groove 18' for receiving the cylindrically arcuate portion of a pawl 22 or 23. The axis of the groove 20 is inclined relative to the hub axis at the same oblique angle as the teeth 16 so that the respective faces 22', 23' of the pawls may make contact with the corresponding faces of the teeth 16 over a greater area. The pawls 22, 23, respectively shown in FIGS. 11 and 12 in the manner of FIGS. 7 and 8 define parallelograms in orthogonal projection and differ in the inclination of their engagement faces 22', 23' relative to the central hub axis. No axial forces are exerted by the pawls 22, 23 on the ring gear 10' in the oblique grooves 20.

While an axially movable ring gear 10 and a fixed planet carrier 8 have been described and illustrated, the invention is equally effective if pawls on an axially movable planet carrier engage oblique faces of ratchet teeth on the hub shell. It is generally more convenient to install the ratchet teeth of pawl couplings on the shell of a multiple-speed hub, but the benefits of this invention are available in a modified arrangement in which the hub shell carries pawls cooperating with ratchet teeth on the ring gear of the planet carrier. In the embodiment of the invention shown in FIG. 1, abutment against the planet carrier 8 limits axial movement of the ring gear 10, but different abutments may be provided without affecting the advantages of this invention.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:
1. A multiple-speed hub comprising:
  a. a hub shell having a central axis and mounted for rotation about said axis;
  b. a driver mounted in said shell for rotation about said axis;
  c. planetary gearing including a sun gear, a ring gear member, and a planet carrier member mounted in said hub shell for rotation of said members relative to said sun gear and said hub shell, and at least one planet gear rotatably mounted on said planet car- rier member and simultaneously meshing with said sun gear and said ring gear member;

d. first coupling means for alternatively coupling said members to said driver for joint rotation; and e. second coupling means including cooperating elements respectively mounted on one of said members and on said hub shell, one of said cooperating elements including a pawl having a first engagement face, and the other element including a plurality of ratchet teeth circumferentially distributed about said axis and having each a second engagement face engageable with said first engagement face,
1. said one member being axially movable in said hub shell, and
2. at least one of said first and second engagement faces being obliquely inclined relative to said axis, whereby said one member is urged to move in an axial direction in said hub shell during driving engagement of said first and second engagement faces.

2. A hub as set forth in claim 1, further comprising yieldably resilient means biasing said one member to move in said axial direction, and control means for shifting said one member axially in said hub shell against the restraint of said yieldably resilient means.

3. A hub as set forth in claim 2, wherein said one member is said ring gear member.

4. A hub as set forth in claim 3, wherein said pawl is mounted on said ring gear member, and said hub shell carries said ratchet teeth, said ratchet teeth having said obliquely inclined engagement faces.

5. A hub as set forth in claim 4, wherein the engagement face of said pawl is parallel to the engagement face of an engaged ratchet tooth, said pawl being mounted on said ring gear member for pivoting movement about an axis parallel to said central axis.

6. A hub as set forth in claim 4, wherein said pawl is mounted on said ring gear member for pivoting movement about an axis obliquely inclined relative to said central axis, the engagement face of said pawl being parallel to the engagement face of an engaged ratchet tooth.

7. A hub as set forth in claim 4, wherein the orthogonal, radial projection of said pawl into a plane tangential to a cylinder about said central axis has the shape of a parallelogram.

8. A hub as set for in claim 4, wherein said ring gear member is formed with a circumferential first groove in a plane radial relative to said central axis, said ring gear member being further formed with a second groove in the circumference thereof intersecting said radial plane and having an axis, said second groove being of circularly arcuate cross section, said pawl being conformingly received in said second groove for pivoting movement about the axis of said second groove, said second coupling means further including a wire spring received in said first groove and biasing said pawl toward a position in which the engagement face of said pawl projects radially outward from said ring gear member.

* * * * *